United States Patent
Benz et al.

(10) Patent No.: US 7,508,577 B2
(45) Date of Patent: Mar. 24, 2009

(54) METHOD AND SYSTEM FOR SUPPRESSING ASE NOISE

(75) Inventors: Andreas Benz, Erlangen (DE); Peter Winzer, Aberdeen, NJ (US); Bernd Teichmann, Eckental (DE)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 113 days.

(21) Appl. No.: 11/093,010

(22) Filed: Mar. 29, 2005

(65) Prior Publication Data

US 2006/0221436 A1    Oct. 5, 2006

(51) Int. Cl.
*H04B 10/17* (2006.01)

(52) U.S. Cl. ............................. 359/337.2; 359/889

(58) Field of Classification Search ............ 359/337.2, 359/341.42, 889
See application file for complete search history.

(56) References Cited

U.S. PATENT DOCUMENTS

| | | | | |
|---|---|---|---|---|
| 5,260,823 A * | 11/1993 | Payne et al. | ............ | 359/337.21 |
| 5,295,015 A * | 3/1994 | Yoneyama | ............ | 359/333 |
| 5,340,979 A * | 8/1994 | Baney et al. | ............ | 250/214 B |
| 5,506,723 A * | 4/1996 | Junginger | ............ | 359/341.3 |
| 5,521,751 A * | 5/1996 | Aida et al. | ............ | 359/337 |
| 5,581,389 A * | 12/1996 | Lee et al. | ............ | 398/196 |
| 5,600,481 A * | 2/1997 | Nakabayashi | ............ | 359/337.13 |
| 5,625,481 A * | 4/1997 | Tamura et al. | ............ | 398/30 |
| 5,664,131 A * | 9/1997 | Sugiya | ............ | 359/337.13 |
| 5,696,707 A * | 12/1997 | Hentschel et al. | ............ | 702/69 |
| 5,801,879 A * | 9/1998 | Burton et al. | ............ | 359/341.2 |
| 5,805,759 A * | 9/1998 | Fukushima | ............ | 385/140 |
| 5,808,785 A * | 9/1998 | Nakabayashi | ............ | 359/337.13 |
| 5,812,710 A * | 9/1998 | Sugaya | ............ | 385/27 |
| 5,835,199 A * | 11/1998 | Phillips et al. | ............ | 356/5.03 |
| 5,838,476 A * | 11/1998 | Harasawa et al. | ............ | 398/177 |
| 5,864,424 A * | 1/1999 | Nakano | ............ | 359/337.2 |
| 5,969,834 A * | 10/1999 | Farber et al. | ............ | 398/34 |
| 6,061,157 A * | 5/2000 | Terahara | ............ | 398/1 |
| 6,243,195 B1 * | 6/2001 | Pedersen et al. | ............ | 398/9 |
| 6,400,881 B1 * | 6/2002 | Seino et al. | ............ | 385/130 |
| 6,437,888 B1 * | 8/2002 | Grasso et al. | ............ | 398/82 |
| 6,437,907 B1 * | 8/2002 | Yoon et al. | ............ | 359/341.32 |
| 6,452,721 B2 * | 9/2002 | Deguchi et al. | ............ | 359/341.33 |
| 6,498,676 B1 * | 12/2002 | Zimmerman et al. | ............ | 359/337.1 |
| 6,535,331 B2 * | 3/2003 | Shiota et al. | ............ | 359/341.32 |
| 6,594,069 B1 * | 7/2003 | Nakazawa et al. | ............ | 359/308 |
| 6,624,929 B2 * | 9/2003 | Kang et al. | ............ | 359/344 |
| 6,668,006 B1 * | 12/2003 | Margalit et al. | ............ | 372/97 |
| 6,671,085 B2 * | 12/2003 | So et al. | ............ | 359/341.42 |
| 6,751,011 B2 * | 6/2004 | Sakurai | ............ | 359/333 |
| 6,936,805 B2 * | 8/2005 | Ahn | ............ | 250/205 |
| 7,092,149 B1 * | 8/2006 | Harasawa et al. | ............ | 359/341.1 |
| 2001/0050807 A1 * | 12/2001 | Deguchi et al. | ............ | 359/341.44 |

(Continued)

*Primary Examiner*—Jack W. Keith
*Assistant Examiner*—Ari M Diacou (57) ABSTRACT

A bandstop filter method and system for suppressing ASE noise is disclosed. In one embodiment of the bandstop filter system, there is provided a first switch, having an input port for receiving an optical signal, and two output ports; a bandstop filter coupled to a first of the two output ports of the first switch; and a second switch, having two input ports and one output port, wherein a first of the two input ports of the second switch is coupled to the bandstop filter and a second of the two input ports of the second switch is coupled to a second of the two output ports of the first switch.

19 Claims, 5 Drawing Sheets

U.S. PATENT DOCUMENTS

| | | | |
|---|---|---|---|
| 2002/0015552 A1* | 2/2002 | Link et al. | 385/24 |
| 2002/0018623 A1* | 2/2002 | Cullen et al. | 385/37 |
| 2002/0181076 A1* | 12/2002 | Bickham et al. | 359/334 |
| 2002/0196495 A1* | 12/2002 | Grasso et al. | 359/127 |
| 2004/0008991 A1* | 1/2004 | Waarts et al. | 398/81 |
| 2004/0114857 A1* | 6/2004 | Yan et al. | 385/27 |
| 2005/0008044 A1* | 1/2005 | Fermann et al. | 372/19 |
| 2006/0051100 A1* | 3/2006 | Watanabe | 398/152 |
| 2007/0110438 A1* | 5/2007 | Su et al. | 398/45 |

* cited by examiner

METHOD AND SYSTEM FOR SUPPRESSING ASE NOISE

FIELD OF THE INVENTION

Embodiments of the present invention relate to optical telecommunication systems and, in particular, to a method and system for suppressing ASE noise using a bandstop filter.

BACKGROUND OF THE INVENTION

Optical amplifiers such as erbium doped fiber amplifiers (EDFAs) or semiconductor optical amplifiers (SOAs) are employed in optical transmission systems to amplify optical signals along the optical transmission path. In one application, optical amplifiers are used in optical receivers prior to photo detection. While an optical signal is being amplified, unwanted Amplified Spontaneous Emission (ASE) noise may be generated. In many cases, the ASE noise will degrade receiver performance.

For example, if an optical amplifier has a wide amplification bandwidth and ASE noise is not sufficiently optically filtered after amplification, ASE noise may present a problem. For those cases, additional filtering of the ASE noise is necessary to achieve good sensitivity of the pre-amplified receiver. The total ASE power is one figure of merit for the sensitivity that can be achieved for this pre-amplified receiver.

Known noise filtering is generally performed using one of gain flattening filters, fixed wavelength band pass filters with the signal centered on the band pass filter, band-edge filters for ASE filtering, or continuously tunable band pass filters. These known noise filters have certain disadvantages.

For example, a gain flattening filter is used to achieve some degree of ASE suppression. But the total ASE power seen at the output is still unacceptably high for large gain/wide bandwidth amplifiers. Fixed-wavelength filters do not work if the signal wavelength changes and the receiver is wavelength independent over a large wavelength range (e.g., WDM systems). Like fixed wavelength filters, a band-edge filter limits the achievable wave length range. In this case, it is limited to some range outside the gain peak and thus the ASE peak of the optical amplifier. Regarding continuously tunable band pass filters, although technically sound, this approach is costly and bulky in deployed systems.

In the laboratory, one would use an optical amplifier and a general filter to remove, or at least minimize, ASE noise. For system implementation, one would use gain flattening filters to remove some, if not all, of the ASE noise between the stages of a multistage optical amplifier. Here, again, one only can attenuate the ASE noise to some degree using these types of filters. One cannot remove all of the ASE noise.

Thus, there is a need for improved ASE noise suppression in broadband optical telecommunication systems.

SUMMARY

Various deficiencies of the prior art are addressed by embodiments of the present invention of a bandstop filter system for ASE suppression.

In accordance with an embodiment of the present invention, there is provided a bandstop filter system for suppressing ASE noise, comprising a first switch, having an input port for receiving an optical signal, and two output ports; a bandstop filter coupled to a first of the two output ports of the first switch; and a second switch, having two input ports and one output port, wherein a first of the two input ports of the second switch is coupled to the bandstop filter and a second of the two input ports of the second switch is coupled to a second of the two output ports of the first switch.

In accordance with another embodiment of the present invention, there is provided a bandstop filter system for suppressing ASE noise, comprising an optical coupler, having an input port for receiving an optical signal, and two output ports; a bandstop filter coupled to a first of the two output ports of the optical coupler; and a switch, having two input ports and one output port, wherein a first of the two input ports of the switch is coupled to the bandstop filter and a second of the two input ports of the switch is coupled to a second of the two output ports of the coupler.

In accordance with yet another embodiment of the present invention, there is provided a free space optics device for suppressing ASE noise, comprising a fiber segment for transmitting an optical signal, the fiber segment having a first portion and a second portion; first and second lenses coupled between the first and second portions of the fiber segment; and a movable bandstop filter, adapted to be positioned between the first and second lenses.

In accordance with a further embodiment of the present invention, there is provided a method for suppressing ASE noise in a single channel optical amplifier; comprising receiving an optical signal for transmission to an input of the optical amplifier; determining the wavelength region in which the received optical signal falls; and coupling a bandstop filter to the output of the optical amplifier if the determined wavelength region of the optical signal is outside the gain peak of the optical amplifier.

BRIEF DESCRIPTION OF THE DRAWINGS

The teachings of the present invention can be readily understood by considering the following detailed description of embodiments of the present invention in conjunction with the accompanying drawings, in which.

To facilitate understanding, identical or similar reference numerals have been used, where possible, to designate identical elements that are common to the figures.

DETAILED DESCRIPTION OF THE INVENTION

Figure 1:
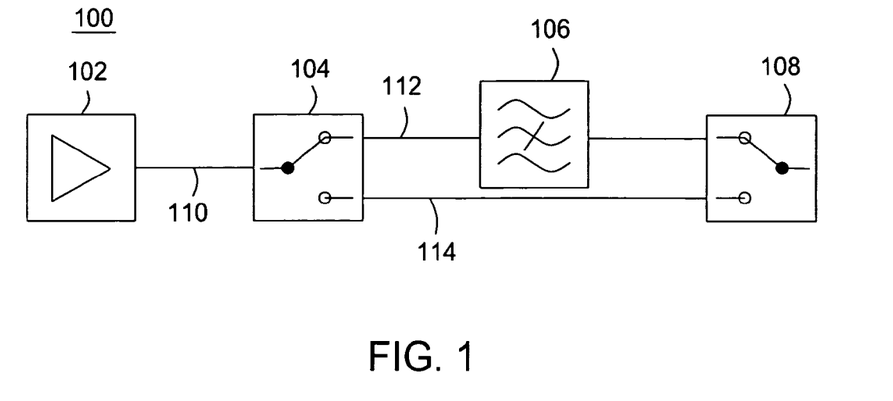
FIG. 1 depicts a bandstop filter system in accordance with an embodiment of the present invention.

FIG. 1 depicts a segment of a long haul optical telecommunication segment 100. The segment is shown at a point in an optical transmission system after a multi-signal optical transmission has been demultiplexed into individual wavelengths or signals. In this embodiment, the segment 100 includes an optical amplifier 102 adapted to receive any individual signal from a demultiplexed broadband optical transmission (single channel). The system further includes a transmission line 110 for coupling the optical amplifier 102 to the input of an optical switch 104. The switch 104 includes one input and two outputs, although alternative switching configurations are contemplated by the present invention. Coupled to the two outputs of the switch 104 are a first optical path 112 and a second optical path 114. The first optical path 112 couples the upper output of the switch 104 to a bandstop filter 106. The segment 100 further includes a second optical switch 108 having two inputs and one output, although alternative switching configurations are contemplated by the present invention. The two inputs of the second optical switch 108 are coupled to the output of the bandstop filter 106 and the optical path 114, respectively.

An incoming signal will be directed through either one of the two optical paths shown in this embodiment depending on whether the incoming signal is in a first or second region. That is, the optical amplifier 102 is capable of operating in single-channel operation mode. In this configuration, there are two distinguishable wavelength regions. First, there is a region in and around the gain peak of the optical amplifier 102. Second, there is a region outside the gain peak (less than the lower wavelength range and greater than the higher wavelength range) of the optical amplifier 102, where the gain of the optical amplifier is substantially lower than the peak gain.

For example, a signal may be directed through an optical path of the optical segment 100 with the switches 104 and 108 in their upper positions (i.e., the top output and input of switches 104 and 108, respectively). Here, a one wavelength signal would propagate through optical amplifier 102, optical path 110, switch 104 in its upper position, optical path 112, bandstop filter 106, and switch 108 in its upper position.

A signal may be directed through a second optical path of the segment 100 with the switches 104 and 108 in their lower position (i.e., the bottom output and input of switches 104 and 108, respectively). Here, a one wavelength signal would propagate through the optical amplifier 102, optical path 110, switch 104 in its lower position, optical path 114, which does not include the bandstop filter, and switch 108 in its lower position.

Thus, if an incoming signal is within the first region, then the gain of the optical amplifier 102 is relatively high, and the power generated from the ASE noise from the receiver pre-amplifier is relatively low. Therefore, no additional filtering is necessarily required. In this case, the signal would travel the lower path—optical amplifier 102, optical path 110, switch 104 where the switch is in the lower position, then optical path 114 to the second switch 108, where that switch 108 is in the lower position.

Figure 2:
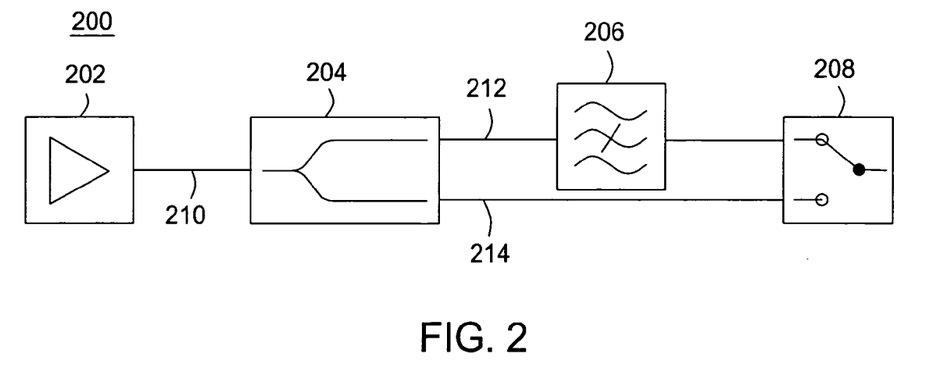
FIG. 2 depicts a bandstop filter system in accordance with another embodiment of the present invention.
Figure 3:
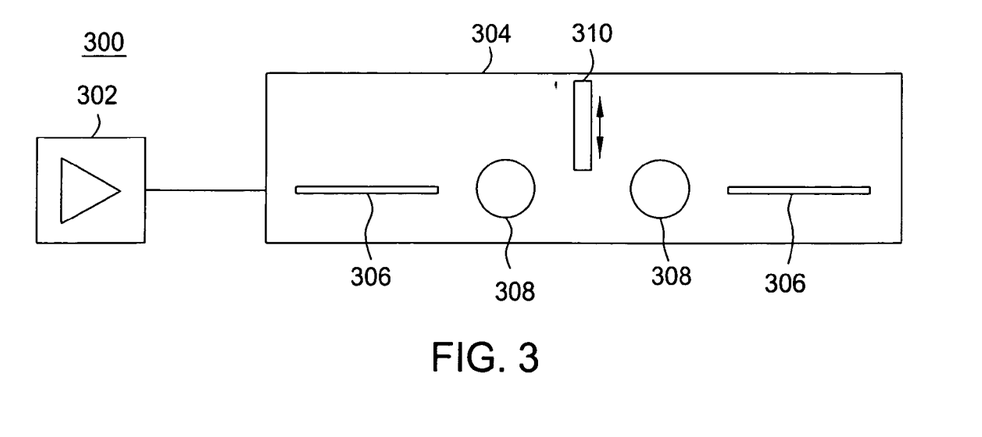
FIG. 3 depicts a bandstop filter system in accordance with yet another embodiment of the present invention.

If, on the other hand, a signal falls in the lower-gain region, the ASE power generated mainly around the amplifier gain peak will be high at the output if filtering is not performed. Not filtering would result in performance penalties. As most of the ASE noise is concentrated in the gain peak region and the signal is outside of this region, a bandstop filter can be inserted in the optical path in this case, improving the ASE characteristics while leaving the signal unchanged. In this regard, the path would be as described above: optical amplifier 102, optical path 110, switch 104 in a top position, optical path 112, bandstop filter 106 and second switch 108 in the top position. For inserting and removing the bandstop filter, several techniques can be used; for example, two 1:2 switches (namely switch 104 and switch 108) may be employed as shown in FIG. 1. Other embodiments are shown in FIGS. 2 and 3. Yet further alternative embodiments are contemplated by the present invention in which a bandstop filter is adapted to be coupled in and out of an optical path, depending on the signal being amplified by the optical amplifier.

If the input signal is within the bandstop characteristics of the filter and the lower path along optical path 114 is selected, the signal passing through the amplifier 102 is amplified and there is no need for additional filtering. In this case the bandstop filter 106 is set to the same wavelength as the gain peak of the amplifier 102. In this mode, there will not be a high ASE noise level to filter out. Therefore, no filtering is necessarily required.

On the other hand, if the input signal is outside of the gain peak of the amplifier 102, then there will be ample ASE noise around the gain peak and one would be best to filter that out. In this case, the switches are moved to select the upper path, i.e., optical path 112. In this position, the signal is amplified by the amplifier 102, passes the bandstop filter 106, and is not affected by the filter. However, the ASE around the gain peak of the particular amplifier is filtered out by the filter 106. The operation and control of the switches may be through the use of the internal controller of the optical amplifier such as an EDFA or SOA.

FIG. 2 depicts an alternative embodiment where the segment 200 may comprise an optical amplifier 202, an optical path 210 that couples the optical amplifier 202 to the input of an optical coupler 204, a first optical path 212 that couples an output of the optical coupler 204 with a bandstop filter 206, and the upper position input of a switch 208. The signal would travel through the second path by way of the optical amplifier 202, the optical path 210, the coupler 204, and a second path 214 to the lower position input of the switch 208. The optical path chosen in this embodiment is similarly determined as with respect to the segment 100 discussed with respect to FIG. 1. The coupler 204 may be a 3 dB coupler, which parses the incoming optical signal into two parts.

The output signal from the segment 200 is similar to the output signal of the segment 100 of FIG. 1. The components used are somewhat different. For example, instead of a first switch, there is provided the coupler 204. Here, an input signal is sent from the amplifier 202 output along path 210. Then, the signal is separated into two signals by the coupler stage 204 into an optical path 212 and an optical path 214. In this scenario, the signal passes through the filter 206 and through the lower path 214. By using the switch 208, the end user can determine which of the paths is necessary. The control of the switch may be performed, as discussed above, by way of the internal controller of the optical amplifier. So, if the signal is within the band, the switch 208 switches to the lower path and one does not have to use the bandstop filter 206. On the other hand, if the signal is outside of the band, then the switch 208 switches to the upper path 212 in order to filter out the ASE noise. The present invention contemplates a multistage amplifier set up as well. For example, there may be another stage of amplifiers after the switch 208.

In an alternate embodiment, as depicted in FIG. 3, a similar segment 300 is achieved through free space optics combined with a mechanical insertion/removal of a filter. In FIG. 3, there is provided an optical amplifier 302. Regarding FIG. 3, in operation, it is the same concept as that used in FIGS. 1 and 2 but instead of using one or two switches to select a path, the system uses a micro optic setup. In this regard, there is the optical amplifier 302 and the micro-optic setup 304.

The micro-optic setup 304 includes fiber portions 306, lenses 308 and a filter 310 therebetween. In this embodiment of the present invention, the fiber 306 and the lenses 308 are positioned such that the signal travels from the first fiber portion 306, through the first lens 308 to the second lens 308 and the second fiber 306. If desired, the filter 310 can be inserted into the optical path or can be removed from the optical path. It is a mechanical movement of the filter 310, which may be, for example, a thin film filter. Alternatively, the filter could be a multi-stage Fabry-Perot filter.

In this embodiment, when the filter 310 is in-line with the signal, the filter acts as a bandstop filter. Therefore, if the signal is within the bandstop filter characteristics of the bandstop filter, the signal can travel through the lenses without having to travel through the filter 310. If, on the other hand, the signal is outside of the gain characteristics of the bandstop filter and the user needs to remove the ASE, the filter 310 is mechanically moved into the optical path.

In FIGS. 2 and 3, both outputs can be used simultaneously for multi-channel applications. In FIG. 2, both paths 212 and 214 would be received. In the case of FIG. 3, the system would use a reflective part of the signal.

The above embodiments are typically used at the receive side of an optical transmission system. These are independent of the optical network. The optical transmission may use DWDM. As such, the segments discussed above, would be placed after a demultiplexer in order to receive a single channel at a time.

Several techniques can be used to accomplish the bandstop function. For example, a thin film filter such as a bandstop filter used for Coarse Wavelength-Division Multiplexing (CWDM) applications can be employed. In the alternative, a multi-stage Fabry-Perot type filter may be used.

Figure 4:
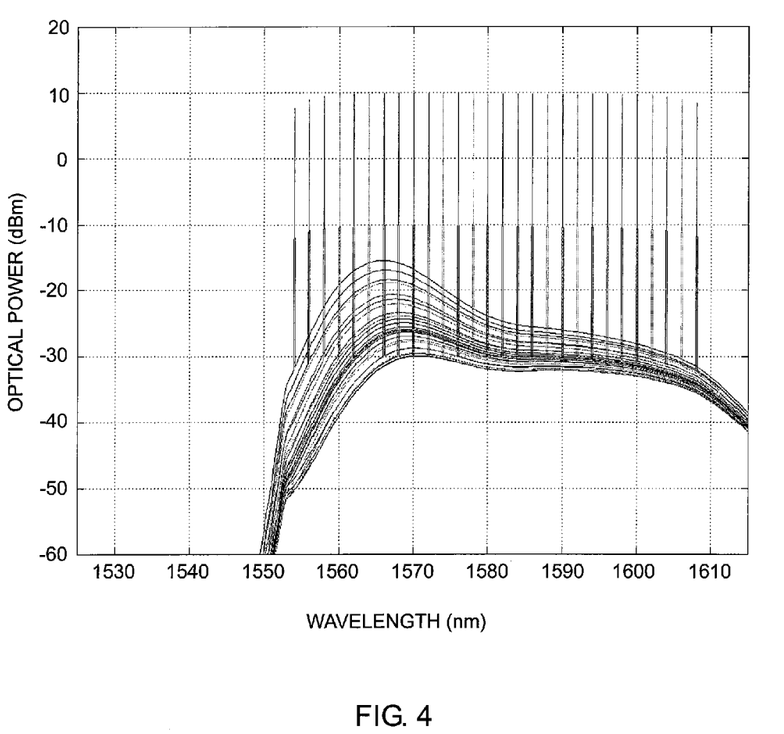
FIG. 4 depicts a graph of a simulated optical power spectrum for each input wavelength at the optical amplifier output.
Figure 5:
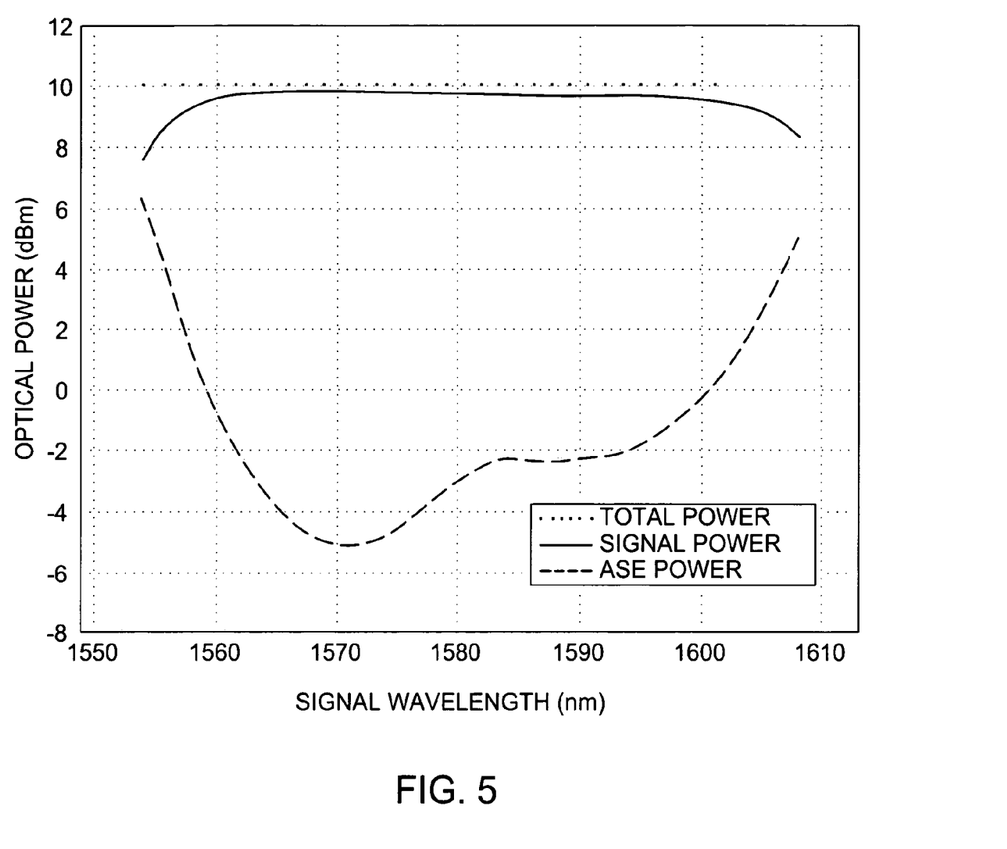
FIG. 5 depicts a graph of the total output power, signal output power and ASE output power of an XL-band optical amplifier with a −12 dBm input power and 170 mW total pump power.
Figure 6:
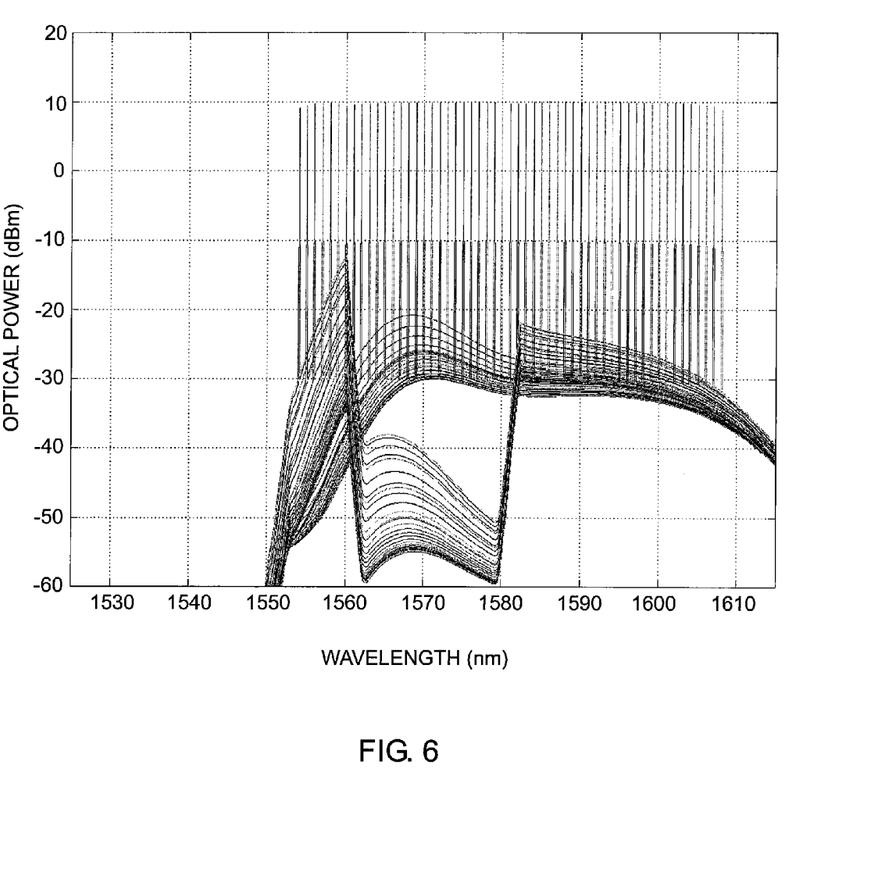
FIG. 6 depicts a graph of an optical power spectrum for each input wavelength at the optical amplifier output in accordance with an embodiment of the present invention.
Figure 7:
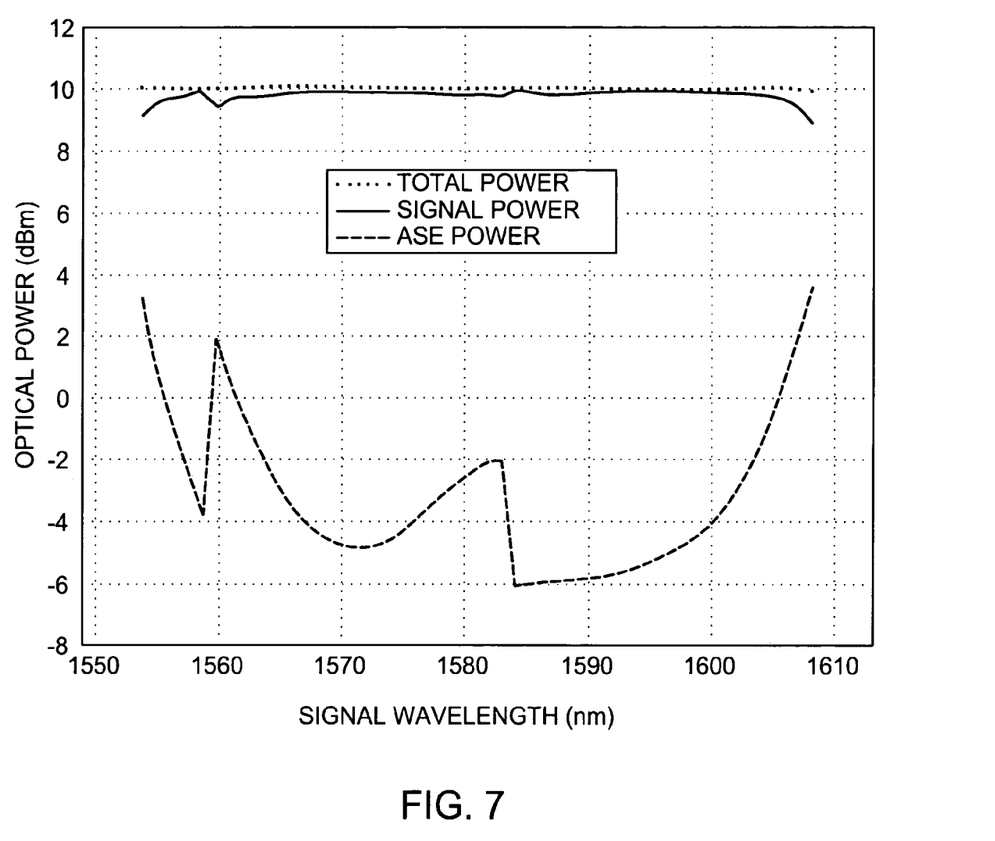
FIG. 7 depicts a graph of the total output power, signal output power and ASE output power of an XL-band optical amplifier with −12 dBm input power and 250 mW total pump power in accordance with an embodiment of the present invention.

FIGS. 4-5 are graphs of a simulation depicting the use of a gain flattening filter (GFF). FIGS. 6-7 depict graphs of the results of signals traveling in one of the embodiments discussed above.

The output spectrum of an L-band optical Erbium Doped Fiber Amplifier (EDFA) using a conventional GFF is depicted in FIG. 4. Fifty-five different input wavelengths are simulated. All different output spectra are shown in the same plot. The signals are simulated one wavelength at a time but they are overlaid in this diagram. FIG. 4 depicts a simulation of the signal passing through an amplifier as described above. Depending on the properties of the amplifier, the output includes the amplified signal and the ASE noise signal. The signal peaks shown in FIG. 4 are the individual signals. The third curve is the ASE noise signal. The gain peak is around 1565 nanometers (nm) in this particular simulation.

FIG. 5 depicts a graph showing the corresponding total ASE output power (dashed line), signal output power (solid line) and the total output power (dotted line). Here, only the integral sums of each of the curves from the plot in FIG. 4 are shown. The X-axis represents the signal wavelength (in nm). FIG. 5 shows total output power, which is the output curve. Here, the amplifier is designed to have a fixed total output power of about 10 dBm for any input signal wavelength. The signal power is highest around the gain peak and it decreases at the edges of the bandwidth of the optical amplifier. So, here the ASE power comes up and the signal power drops on the edges. Thus, FIGS. 4 and 5 depict a simulation using a GFF. In contrast, FIGS. 6 and 7, as discussed herein, depict graphs of embodiments using the bandstop filter system of the present invention.

The same two graphs for an EDFA, for example, using the improved filter system in accordance with embodiments of the present invention are depicted in FIGS. 6 and 7, respectively. The distance between total ASE power and signal power is much larger in the latter case using the improved bandstop filter system of the present invention. In FIGS. 6 and 7, a bandstop filter is used. However, depending on the signal wavelength, the bandstop filter is inserted after the optical amplifier or is removed from the optical path. Then, if the signal is outside of the bandstop filter characteristic, there is a different behavior. That is, the signals inside the bandstop filter yield similar behavior as in FIG. 4.

A range of wavelengths, for example, would be between about 1560 nm (lowest wavelength) to about 1583 (highest wavelength). For every signal lower than about 1559 nm and/or higher than about 1584 nm, the bandstop filter is inserted into the optical path. FIGS. 6 and 7 depict graphs showing an input signal in the above regions as it passes through any one of the segments discussed with respect to FIG. 1, 2 or 3. The ASE noise drops between about 1560 to 1580 nm for the reasons discussed herein. Outside of those bands, i.e., about 1559 nm and 1581 nm, the ASE noise drops considerably.

The wavelength passing through any one of the segments is known because a microcontroller circuit (not shown) is used and the received wavelength is provisioned by a network operator or the circuit detects the signal wavelength when it is being received as discussed above with respect to the optical amplifier's internal controller. In these types of high bit rate optical transmission systems, the signal has to be amplified with a very high gain amplifier. This is one reason ASE noise is significant enough to cause a problem. As the bit rate increases, it gets more and more likely that there will be such a noise problem.

In an alternative embodiment, the segments shown in FIGS. 1 through 3 can be part of a multi-stage optical amplifier system. Thus, there may be another stage of amplifiers after the switch 108 or 208. There may also be another stage of amplifiers after the fiber module 304. One of ordinary skill in the art would recognize that if a single-stage amplifier is discussed, it could equally be used in a multi-stage amplifier setup after the second switch.

Combining the advantages of a fixed wavelength filter with the application scope of a continuously tunable filter in the context of optically pre-amplified receivers is an advantageous result of the embodiments of the present invention.

In addition, use of the internal controller of the EDFA to control the switching (if required by the received wavelength) is also advantageous. Using an EDFA or other optical amplifier with gain peak substantially of the same signal wavelength is novel. Exploiting the restriction to a single channel amplifier to modify the gain profile of the amplifier drastically thereby improving the performance is also novel. The sensitivity of the optically pre-amplified system is improved over using a standard low-cost design approach (e.g., using GFFs inside an EDFA).

While the foregoing is directed to various embodiments of the present invention, other and further embodiments of the invention may be devised without departing from the basic scope thereof. As such, the appropriate scope of the present invention is to be determined according to the claims, which follow.

What is claimed is:

1. A system for suppressing amplified spontaneous emission (ASE) noise, comprising:
    a bandstop filter in a first optical signal path for filtering out ASE from an optical signal without affecting a signal component in the optical signal; and
    means for directing the optical signal toward an output via one of a plurality of optical signal paths, the plurality of optical signal paths including the first optical signal path;
    wherein the optical signal is directed to the first optical signal path based on whether the signal component is outside a gain peak of an optical amplifier coupled to an input of the directing means.

2. The system of claim 1, wherein said means for directing the optical signal comprises:
 a first switch, having an input port configured to receive the optical signal, and two output ports;
 the bandstop filter being coupled to the upper of the two output ports of the first switch; and
 a second switch, having two input ports and one output port, wherein the upper of the two input ports of the second switch is coupled to the bandstop filter and the lower of the two input ports of the second switch is coupled to the lower of the two output ports of the first switch.

3. The system of claim 2, wherein the optical amplifier is coupled to the input port of the first switch.

4. The system of claim 3, wherein the optical amplifier further comprises a controller configured to move the first switch to one of its two output ports and the second switch to one of its two input ports.

5. The system of claim 4, wherein the optical signal is within a wavelength region in the gain peak of the optical amplifier, the first switch is configured to its lower output port, and the second switch is configured to its lower input port.

6. The system of claim 4, wherein the optical signal is within a wavelength region outside of the gain peak of the optical amplifier, the first switch is configured to its upper output port, and the second switch is configured to its upper input port.

7. The system of claim 1, wherein said means for directing the optical signal comprises:
 an optical coupler, having an input port configured to receive the optical signal, and two output ports;
 the bandstop filter coupled to the upper of the two output ports of the optical coupler; and
 a switch, having two input ports and one output port, wherein the upper of the two input ports of the switch is coupled to the bandstop filter and the lower of the two input ports of the switch is coupled to the lower of the two output ports of the coupler.

8. The system of claim 7, wherein the optical amplifier is coupled to the input port of the optical coupler.

9. The system of claim 8, wherein the optical amplifier further comprises a controller configured to move the switch to one of its two input ports.

10. The system of claim 9, wherein the optical signal is within a wavelength region in the gain peak of the optical amplifier, and the switch is moved by the controller to its lower input port.

11. The system of claim 9, wherein the optical signal is within a wavelength region outside of the gain peak of the optical amplifier, and the switch is moved by the controller to its upper input port.

12. The system of claim 1, wherein said means comprises:
 a fiber segment for transmitting an optical signal, the fiber segment having a first portion and a second portion;
 first and second lenses coupled between the first and second portions of the fiber segment; and
 said bandstop filter comprises a movable bandstop filter adapted to be positioned between the first and second lenses.

13. The device of claim 12, further comprising an optical amplifier coupled to the first portion of the fiber segment.

14. The system of claim 13, wherein the optical amplifier further comprises a controller for controlling the moveable bandstop filter.

15. The system of claim 14, wherein, if the optical signal is within a wavelength region in the gain peak of the optical amplifier, the moveable bandstop filter is not positioned by the controller between the first and second lenses, whereby the optical signal does not travel through the bandstop filter.

16. The system of claim 14, wherein, if the optical signal is within a wavelength region outside of the gain peak of the optical amplifier, the moveable bandstop filter is positioned by the controller between the first and second lenses, whereby the optical signal travels through the bandstop filter.

17. The system of claim 1, wherein the bandstop filter is a thin film filter.

18. The system of claim 1, wherein the bandstop filter is a multi-stage Fabry-Perot filter.

19. The system of claim 7, wherein the optical coupler is a 3 dB coupler.

* * * * *